(12) United States Patent
Aitken et al.

(10) Patent No.: US 9,694,898 B2
(45) Date of Patent: Jul. 4, 2017

(54) METHODS FOR MANUFACTURING AN I-STRINGER OF AN AIRCRAFT AND DEVICES FOR USE IN SUCH METHODS

(71) Applicant: Gulfstream Aerospace Corporation, Savannah, GA (US)

(72) Inventors: Charles Aitken, Savannah, GA (US); Brenden A. Autry, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 0 days.

(21) Appl. No.: 15/277,821

(22) Filed: Sep. 27, 2016

(65) Prior Publication Data

US 2017/0029137 A1  Feb. 2, 2017

Related U.S. Application Data

(62) Division of application No. 14/066,376, filed on Oct. 29, 2013, now Pat. No. 9,475,569.

(51) Int. Cl.
| | |
|---|---|
| *B64F 5/00* | (2017.01) |
| *B64C 3/18* | (2006.01) |
| *B29C 70/54* | (2006.01) |
| *B64C 1/06* | (2006.01) |
| *B29C 70/42* | (2006.01) |
| *B29C 70/44* | (2006.01) |
| *B29D 99/00* | (2010.01) |
| *B64C 1/26* | (2006.01) |
| *B64F 5/10* | (2017.01) |
| *B64C 1/00* | (2006.01) |

(52) U.S. Cl.
CPC .............. *B64C 3/182* (2013.01); *B29C 70/42* (2013.01); *B29C 70/44* (2013.01); *B29C 70/54* (2013.01); *B29D 99/001* (2013.01); *B29D 99/0007* (2013.01); *B64C 1/064* (2013.01); *B64C 1/26* (2013.01); *B64F 5/10* (2017.01); *B64C 2001/0072* (2013.01); *Y02T 50/433* (2013.01); *Y10T 29/49622* (2015.01); *Y10T 29/53* (2015.01)

(58) Field of Classification Search
CPC ....... B64F 5/0009; B64C 3/182; B64C 1/064; B64C 2001/0072
See application file for complete search history.

(56) References Cited

U.S. PATENT DOCUMENTS

| | | | | |
|---|---|---|---|---|
| 8,911,650 | B2 * | 12/2014 | Topping | B29C 70/48 |
| | | | | 264/257 |
| 9,120,553 | B2 * | 9/2015 | Gensewich | B29C 70/44 |
| 9,144,948 | B2 * | 9/2015 | Firko | B29D 99/0003 |
| 9,248,903 | B2 * | 2/2016 | Eden | B64C 3/28 |
| 9,272,767 | B2 * | 3/2016 | Stewart | B64C 1/064 |
| 9,314,975 | B1 * | 4/2016 | Matsen | B29C 51/421 |
| 9,370,910 | B2 * | 6/2016 | Schaaf | B29C 63/024 |
| 2007/0175571 | A1 | 8/2007 | Rubin et al. | |
| 2007/0175573 | A1 | 8/2007 | Fox et al. | |
| 2008/0302915 | A1 | 12/2008 | Yip et al. | |
| 2009/0320292 | A1 | 12/2009 | Brennan et al. | |
| 2011/0088833 | A1 | 4/2011 | Guzman et al. | |
| 2011/0284693 | A1 | 11/2011 | Barnard et al. | |
| 2012/0076989 | A1 | 3/2012 | Bland | |
| 2013/0209746 | A1 | 8/2013 | Reighley et al. | |

FOREIGN PATENT DOCUMENTS

| | | |
|---|---|---|
| DE | 102008012252 A1 | 9/2009 |
| EP | 0027107 B1 | 7/1986 |

OTHER PUBLICATIONS

German Patent and Trademark Office, First Examination Report received for Application No. 10 2014 015 840.3, mailed Feb. 8, 2016.
Canadian Intellectual Property Office, Official Action for Canadian Patent Application No. 2,864,310 mailed Oct. 5, 2016.

* cited by examiner

*Primary Examiner* — Richard Chang
(74) *Attorney, Agent, or Firm* — LKGlobal | Lorenz & Kopf, LLP

(57) ABSTRACT

Methods for manufacturing a reinforced composite structure for an aircraft and devices used in such methods are provided. A device includes a base, a first support member fixedly attached to the base, and a second support member fixedly attached to the base and aligned longitudinally with the first support member. The first support member and the second support member are spaced a first distance apart. Two pinching wheels are spaced a second distance apart. The two pinching wheels are positioned proximate to ends of the first support member and the second support member. The second distance is less than the first distance. The two pinching wheels are configured to receive a composite material layout between them and to cause two lengths of the composite material layout to contact each other.

13 Claims, 6 Drawing Sheets

METHODS FOR MANUFACTURING AN I-STRINGER OF AN AIRCRAFT AND DEVICES FOR USE IN SUCH METHODS

CROSS-REFERENCE TO RELATED APPLICATIONS

This application is a divisional application of U.S. application Ser. No. 14/066,376, filed Oct. 29, 2013, which is hereby incorporated in its entirety by reference.

TECHNICAL FIELD

The technical field generally relates to methods for manufacturing reinforced structures and devices useful in such methods, and more particularly relates to methods for manufacturing reinforced structures of aircraft, such as fiber reinforced I-stringers, and devices for use in such methods.

BACKGROUND

The fuselage, wings, and empennage of an aircraft typically include stringers that are coupled to skin structures that form the smooth aerodynamic outer surfaces of the fuselage, wings, and empennage. The stringers and skin structures cooperate to provide flexural and torsional stiffness to these sections of the aircraft. Traditionally, the fuselage, wings, and empennage surfaces and the associated stringers are fabricated from metal, such as aluminum, steel, or titanium. The stringer may include a web portion, such as a planar wall, that is generally oriented in a direction approximately perpendicular to the skin structure and extends in a generally lengthwise direction along the fuselage and empennage and in a generally span-wise direction along the wing so that the web portion provides resistance to bending. A flange portion may be positioned on one or both of the longitudinal edges of the web portion to provide increased rigidity and support to the stringer. The flange portion along one of the longitudinal edges of the web portion can also be used as an attachment surface for attaching the stringer to the skin structure.

Fiber reinforced composite materials are widely used in a variety of commercial and military aircraft products as a substitute for metals, particularly in applications where relatively low weight and high mechanical strength are desired. The material is generally comprised of a network of reinforcing fibers that are arranged in layers or plies. The layers include a resin matrix that substantially wets the reinforcing fibers and that is cured to form an intimate bond between the resin and the reinforcing fibers. The composite material may be formed into a structural component by a variety of known forming methods, such as extrusion, vacuum bagging, autoclaving, and/or the like.

The skins and stringers for various sections of aircrafts are transitioning from metallic materials to fiber reinforced composite materials. However, the manufacture of stringers and stringers affixed to skin structures can be quite time consuming. As there can be up to almost 6.5 kilometers of stringers in aircraft wing alone, the manufacture of stringers by hand is time and cost prohibitive. In addition, the hand manufacture of stringers may cause defects and non-conformities that compromise the rigidity and support of the stringer.

Accordingly, it is desirable to provide methods for fabricating reinforced composite structures for aircraft, such as I-stringers, that can be prepared by batch or continuous automated methods. In addition, it is desirable to provide devices for use in such methods. Furthermore, other desirable features and characteristics will become apparent from the subsequent detailed description and the appended claims, taken in conjunction with the accompanying drawings and this background.

BRIEF SUMMARY

Methods for manufacturing a reinforced composite structure for an aircraft and devices used in such methods are provided. In accordance with an exemplary embodiment, a method includes advancing a composite material layout through a cap-forming device. The advancing results in a preformed cap section, a first length of the composite material layout and a second length of the composite material layout. The composite material layout is removed from the cap-forming device and the preformed cap section of the composite material layout is arranged within a cavity of a flexible mandrel with a foot portion of the first length and a foot portion of the second length remaining outside the cavity of the flexible mandrel. The foot portion of the first length and the foot portion of the second length contact a skin structure. The composite material layout is heated and pressurized using the flexible mandrel to cure the composite material layout and form the reinforced composite structure affixed to the skin structure.

In accordance with another exemplary embodiment, a method of manufacturing an I-stringer for an aircraft includes overlapping composite material plies in an offset manner and positioning a pre-cured cap insert overlying the composite material plies. The composite material plies and the pre-cured cap insert are arranged into a cap-forming device having a first linear space for receiving the composite material plies and the pre-cured cap insert and a second linear space for receiving a first length and a second length of the composite material plies. The first length and the second length are caused to contact each other at a contact area while advancing the composite material plies and the pre-cured cap insert through the cap-forming device. Heat is applied to the contact area to cause the first length and the second length at the contact area to adhere to each other along a length of the composite material plies. The composite material plies and the pre-cured cap insert are arranged into a cavity of a flexible mandrel to form a web portion and a foot portion of the first length and a foot portion of the second length that remain outside the flexible mandrel. The foot portion of the first length and the foot portion of the second length contact a skin structure. Heat and pressure are applied to the composite material plies to form the I-stringer. The flexible mandrel is removed from the I-stringer.

In accordance with an exemplary embodiment, a device for forming a cap section of an I-stringer of an aircraft includes a base, a first support member fixedly attached to the base, and a second support member fixedly attached to the base and aligned longitudinally with the first support member. The first support member and the second support member are spaced a first distance apart. A vertical wheel is configured to roll along the base. Two pinching wheels are spaced a second distance apart and are positioned proximate to ends of the first support member and the second support member. A first diagonal member is supported by the first support member and a second diagonal member is supported by the second support member. The first diagonal member forms an angle with the second diagonal member and each have ends that are spaced a third distance apart. A center of the first distance is co-linear with a center of the second distance.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Various embodiments herein relate to methods for manufacturing reinforced composite structures for aircraft. The methods can be used for manufacturing such structures in batch or, alternatively, the methods can be automated so that the structures are made in a continuous flow, such as in an automated assembly or conveyor line. As described below, the methods utilize a cap-forming device and a flexible mandrel that aid in the formation of the reinforced composite structures. In this regard, output of reinforced composite structures over a given time can be increased. In addition, the reinforced composite structures can be manufactured with fewer defects and non-conformities compared to manually manufactured structures.

Figure 1:
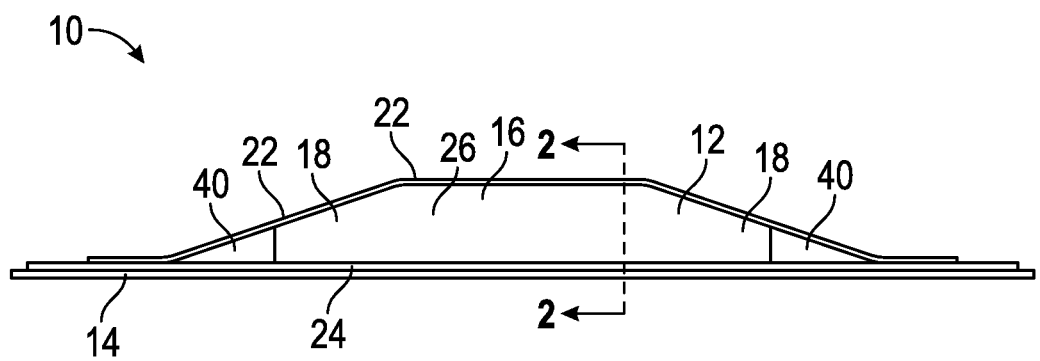
FIG. 1 is a side view of a reinforced composite structure for a representative aircraft in accordance with an exemplary embodiment.
Figure 2:
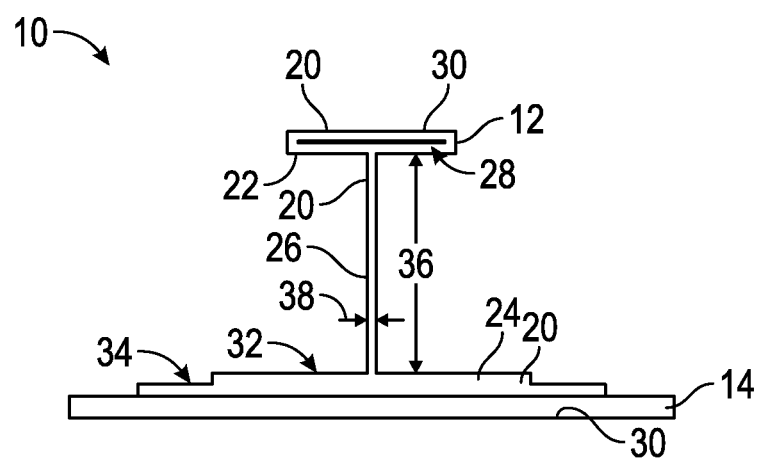
FIG. 2 is a cross-sectional view of the reinforced composite structure of FIG. 1.

Referring to FIGS. 1-2, a side view and a sectional view of a reinforced composite structure 10 for an aircraft in accordance with an exemplary embodiment are provided. The reinforced composite structure 10 comprises a fiber reinforced composite stringer 12 and a skin structure 14 that is affixed to the fiber reinforced composite stringer 12. As will be discussed in further detail below, the fiber reinforced composite stringer 12 and the skin structure 14 are each formed of fiber reinforced composite material 30, which is in a cured condition at this stage. As illustrated, in accordance with an exemplary embodiment, the fiber reinforced composite stringer 12 comprises a beam body portion 16 and two runout portions 18 that extend from the beam body portion 16 in opposite directions. The beam body portion 16 and the runout portion 18 are defined by projection of a variable I-shaped cross-section 20 (see the cross-sectional view of the fiber reinforced composite stringer 12 illustrated in FIG. 2) longitudinally along at least a portion of an entire combined length of the beam body 16 and runout portions 18. Although the skin structure 14 is shown as being relatively flat, it is to be understood that the skin structure 14 may be contoured and include small steps or drop-offs and that the fiber reinforced composite stringer 12 generally follows the contours of the skin structure 14. Accordingly, the direction and length that the variable I-shaped cross-section 20 is projected to define of the fiber reinforced composite stringer 12 can be linear, non-linear, or combinations of linear and non-linear so that the fiber reinforced composite stringer 12 can generally follow the contours of the skin structure 14.

The variable I-shaped cross-section 20 has a cap section 22, a foot section 24, and a web section 26 that extends between the cap and foot sections 22 and 24. As will be discussed in further detail below, the fiber reinforced composite stringer 12 comprises a pre-cured cap insert 28 disposed in the cap section 22 of the beam body 16 and runout portions 18, with the fiber reinforced composite material 30 of the cap section 22 covering the pre-cured cap insert 28. The foot section 24 is affixed to the skin structure 14 and, as illustrated, can have a first step portion 32 and a second step portion 34 for transitioning to the skin structure 14.

Figure 3:
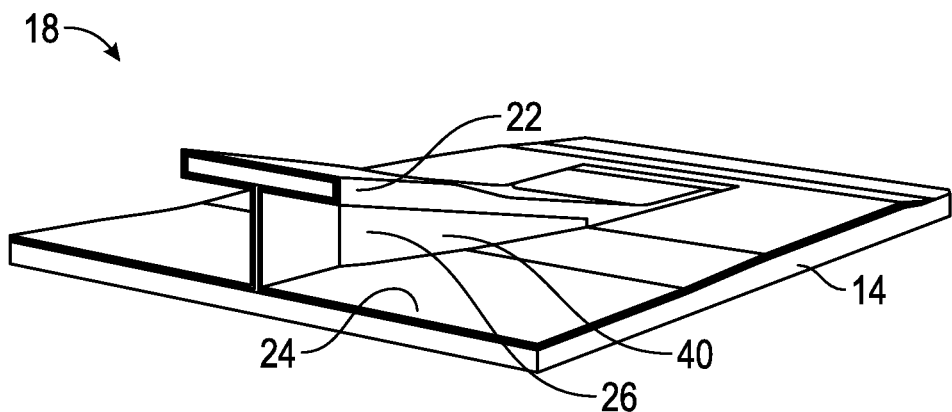
FIG. 3 is a partial perspective view of a runout portion of a reinforced composite structure in accordance with an exemplary embodiment.
Figure 4A:
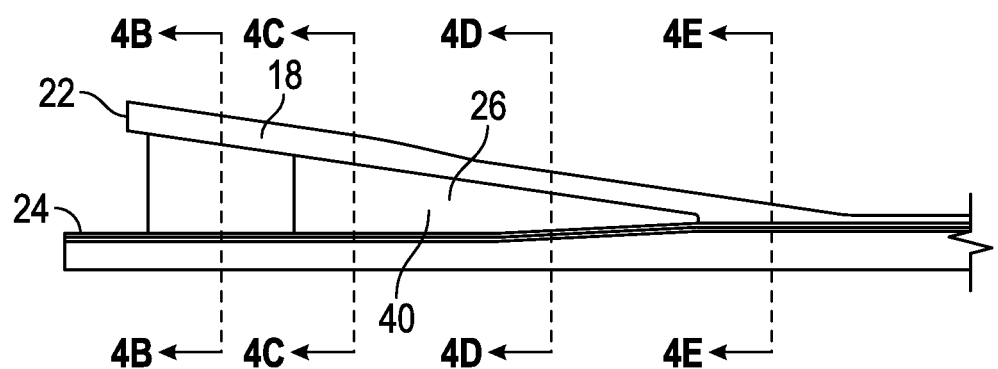
FIG. 4A is a side view of the runout portion of FIG. 3.
Figure 4B:
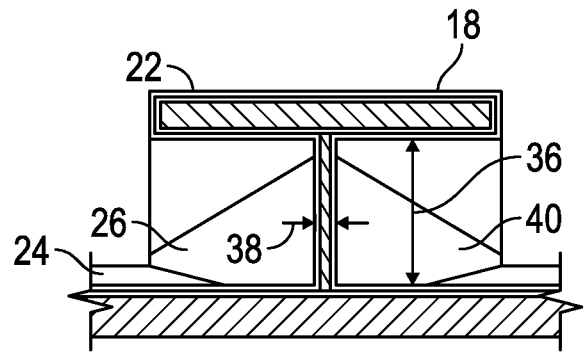
FIGS. 4B-4E are sectional views of the runout portion of FIG. 4A.
Figure 4C:
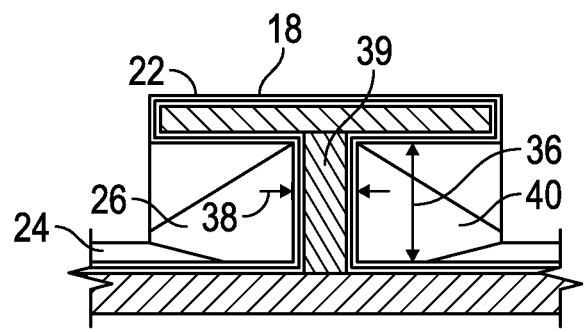
Figure 4D:
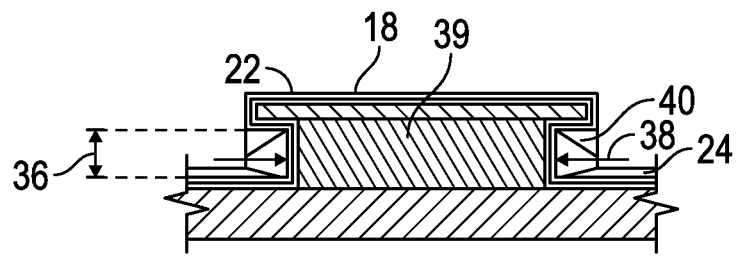
Figure 4E:
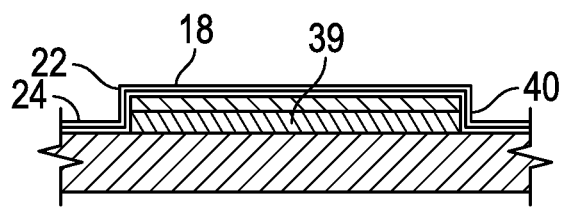

Referring also to FIGS. 3-4E, the web section 26 has a height indicated by double headed arrow 36 and a width indicated by opposing single headed arrows 38. In an exemplary embodiment, the portions of the web section 26 that extend along the runout portions 18 each include a "wedge-like" shape 40. In particular, the variable I-shaped cross-section is configured such that the height (indicated by double headed arrow 36) and width (indicated by opposing single headed arrows 38) of the web section 26 tapers and flares, respectively, distally along a length of the corresponding runout portion 18 to merge the cap section 22 with the foot section 24. In an exemplary embodiment, each of the runout portions 18 comprises a web wedge insert 39 (e.g. wedge shaped insert) that is disposed in the web section 26 of the runout portion 18 extending longitudinally long at least a portion of the entire length of the runout portion 18. The fiber reinforced composite material 30 overlies the web wedge insert 39. In this regard, the web wedge insert 39 helps form the "wedge-like" shape 40. The web wedge insert 39 can be made from a relatively rigid, low density material, such as rigid foam, e.g., polymethacrylimide (PMI) rigid foam. One such suitable material is Rohacell® 51 WF, manufactured by Evonik Industries AG headquartered in Darmstadt, Germany. Other relatively rigid, low density materials known to those skilled in the art may also be used to form the web wedge insert 39.

FIGS. 5-13 illustrate a method for making a reinforced composite structure 10 in accordance with various embodiments. The described process steps, procedures, and materials are to be considered only as exemplary embodiments. Various steps in the manufacture of reinforced composite structures are well known and so, in the interest of brevity, some conventional steps will only be mentioned briefly herein or will be omitted entirely without providing the well-known process details.

Figure 5:
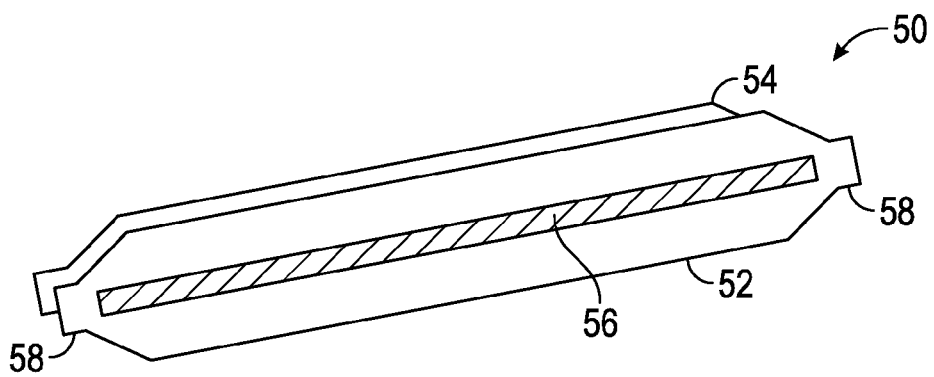
FIG. 5 illustrates a perspective view of a step in a method for manufacturing a reinforced composite structure in accordance with an exemplary embodiment, wherein a composite material layout is formed.

Referring to FIG. 5, a composite material layout 50 is formed by overlapping a first composite material ply 52 on a second composite material ply 54 in an offset manner. In an exemplary embodiment, the plies have a length that is the desired length of the resulting cap section 22 of FIG. 1 and each have tapered ends. In another embodiment, the plies 52 and 54 are of the same size and are offset such that the edges of the plies do not align. For example, as illustrated in FIG. 5, the edges and ends of the plies can be offset from each other by, for example, 6.35 mm (¼ inch) or, for example, 12.7 mm (½ inch). Alternatively, the plies can be of different sizes. While FIG. 5 illustrates composite material layout 50 with two composite material plies 52 and 54, it will be appreciated that the composite material layout 50 may comprise one or more than two plies as is suitable for a particular reinforced composite structure 10.

The composite material plies 52 and 54 are layers of reinforcing fibers pre-impregnated with a resin ("fiber-reinforced prepreg") as is well known in the art. The plies may include layers of unidirectional fiber-reinforced prepreg, cloth or woven fiber-reinforced prepreg, random fiber-reinforced prepreg, braided fiber-reinforced prepreg, continuous fiber-reinforced prepreg, and/or discontinuous fiber-reinforced prepreg. Non-limiting examples of reinforcing fibers include S-glass fibers, E-glass fibers, carbon fibers, ceramic fibers, metallic fibers, polymeric fibers, and the like. Polymeric resins include, but are not limited to, epoxies, polyurethanes and/or polyurethane precursors, polyesters and/or polyester precursors, and the like. Other reinforcing fibers and/or polymeric resins known to those skilled in the art of fiber reinforced composite materials also may be used.

The composite material layout 50 also includes a pre-cured cap insert 56, such as the pre-cured cap insert 28 of FIG. 2. The pre-cured cap insert 56 is positioned overlying the composite material plies 52 and 54 such that opposing end portions 58 of the plies 52 and 54 extend laterally beyond the pre-cured cap insert 56 and the pre-cured cap insert is centered relative to the composite material layout 50. In an exemplary embodiment, the pre-cured cap insert 56 is configured as an elongated strip and provides a rigid form for facilitating shaping and handling of the composite material layout 50. The pre-cured cap insert 56, for example, is formed of unidirectional carbon fiber-reinforced material. The pre-cured cap insert has a length that corresponds to the desired length of the cap section 22, the runout portions 18 and to the end of fiber reinforced composite stringer 12 of FIG. 1. It will be appreciated that the composite material layout 50 can be formed in batch or, alternatively, can be made in a continuous system in which, for example, the plies 52 and 54 can each be on rolls from which they are stretched out, cut-in a tapered fashion, positioned relative to each other on a conveyor and/or assembly system, and configured with the pre-cured insert by automated means.

Figure 6:
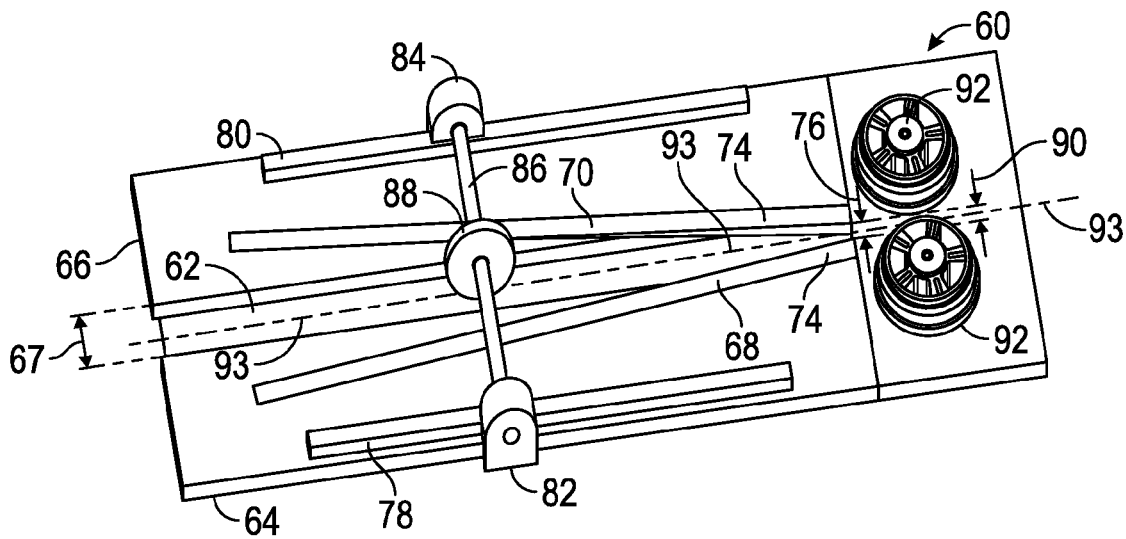
FIG. 6 is a perspective view of a cap-forming device, in accordance with an exemplary embodiment.
Figure 7:
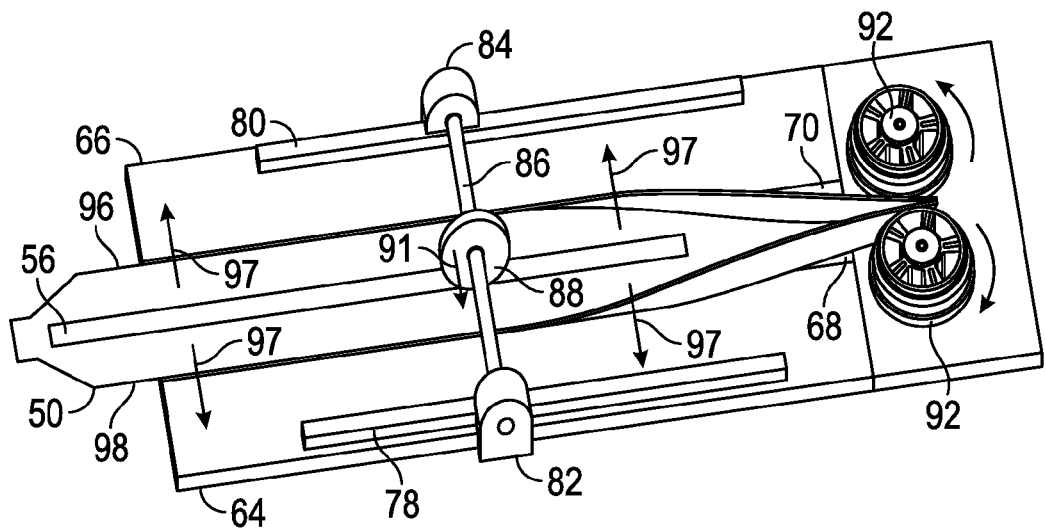
FIG. 7 illustrates in perspective view the formation of a preformed cap section using the cap-forming device of FIG. 6, in accordance with an exemplary embodiment.

Next, referring to FIGS. 6 and 7, the composite material layout 50 is arranged into and advanced through a cap-forming device 60. In an exemplary embodiment, the cap-forming device 60 includes a base 62, a first support member 64 extending along a length of the base on one side of the base, for example, on a right side of the base, and a second support member 66 extending along the length of an opposing side of the base, for example, on a left side of the base. The first support member 64 and the second support member 66 are spaced from each other along the length of the base by a distance indicated by double-headed arrow 67, which depends on the design width of the cap. A first diagonal member 68 is supported by the first support member 64 and a second diagonal member 70 is supported by the second support member 66. The first diagonal member and the second diagonal member form an angle and come together at ends 74 of the supporting members so that, as described below, composite material plies 52 and 54 of FIG. 5 wrap around the pre-cured cap insert 56 with a distance, indicated by opposing arrows 76, based on a thickness of the plies together.

The cap-forming device 60 further includes a first rail 78 fixedly attached to an outer edge of the first support member 64 and a second rail 80 fixedly attached to an outer edge of the second support member 66. A first slide member 82 is slidably mounted onto the first rail 78 and a second slide member 84 is slidably mounted onto the second rail 80. An inflexible rod 86 is rotatably supported by the first slide member 82 and the second slide member 84, such as by placement of each end of the rod in a cavity of each of the slide members. A vertical wheel 88 is supported by the inflexible rod 86. The vertical wheel is of a radius such that the vertical wheel contacts base 62. Two pinching wheels 92 are supported by the base 62 proximate to the ends 74 of the supporting members. The two pinching wheels are separated by a distance, indicated by arrows 90, based on the a thickness of the composite material plies 52 and 54 together, as described below. A center 93 of the distance 90 is collinear with a center 93 of the distance 76 between first diagonal member 68 and second diagonal member 70 and with a center 93 of the distance 67 between first support member 64 and second support member 66. The vertical wheel 88 is aligned to roll longitudinally along the base 62 and along center 93.

Figure 8:
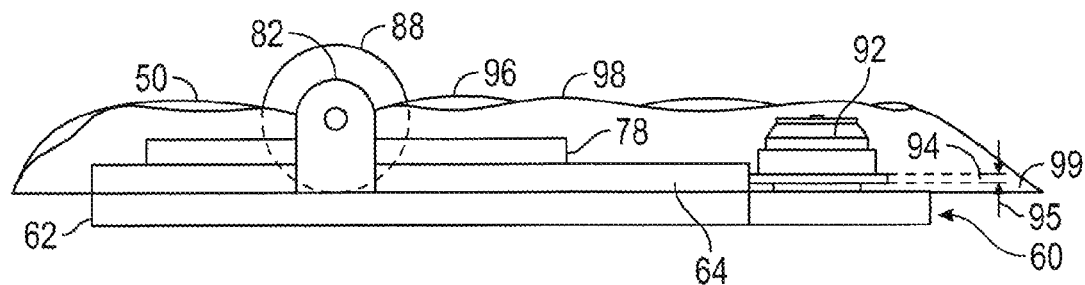
FIG. 8 illustrates in a side view the formation of a preformed cap section using the cap-forming device of FIG. 6, in accordance with an exemplary embodiment.

Referring particularly to FIG. 7, as the composite material layout 50 of FIG. 5 is advanced through the cap-forming device 60, the vertical wheel 88 presses the pre-cured cap insert 56 against the composite material plies 52 and 54, as illustrated by arrow 91. As the vertical wheel 88 urges the pre-cured cap insert against the composite material plies 52 and 54, the plies 52 and 54 are pulled outward, indicated by arrows 97, toward the outer edges of the cap-forming device 60. Referring now, to FIG. 8, as the composite material layout 50 continues to advance through the cap-forming device, the plies are urged through the distance 76 between the first diagonal member 68 and the second diagonal member 70 and, in turn, between the two pinching wheels 92. In this regard, lengths 96 and 98 of the plies that extend beyond the lengthwise sides of the pre-cured cap insert 56 are forced around the pre-cured cap insert and together just above the pre-cured cap insert 56 at a contact area designated by dotted lines 94, thereby enveloping the pre-cured cap insert. An exemplary width, indicated by arrows 95, of the contact area 94 is about 6.35 mm (¼ inch). In an embodiment, heat is applied to the contact area 94 at a temperature sufficient to cause the plies to stick to each other at the contact area but not so high that the plies melt. For example, the temperature may be in the range of about 100 to about 150° C. Heat is applied by, for example, a heating gun. In this regard, enveloping of the pre-cured cap insert 56 by the lengths 96 and 98 result in the formation of a preformed cap section 99, also referred to as cap section 22 in FIGS. 1 and 2.

Figure 9:
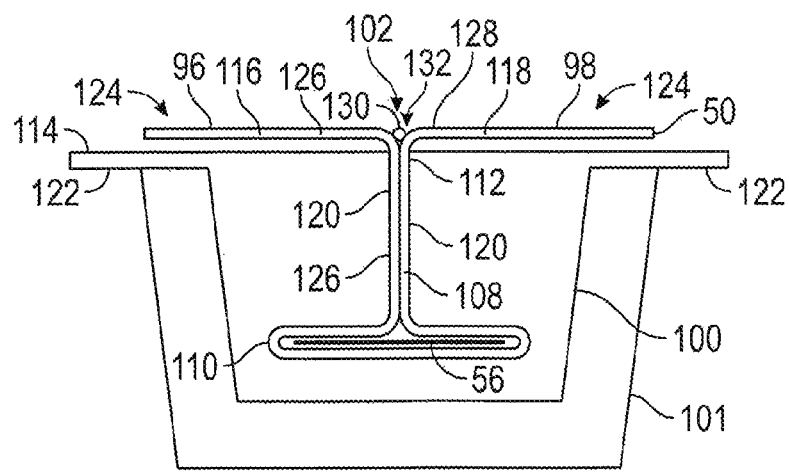
FIG. 9 illustrates in cross-sectional view the formation of the reinforced composite structure using a flexible mandrel, in accordance with an exemplary embodiment.
Figure 10:
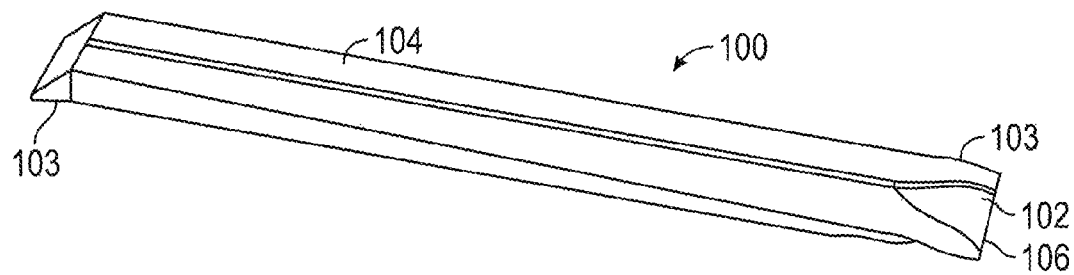
FIG. 10 illustrates in perspective view the flexible mandrel of FIG. 9, in accordance with an exemplary embodiment.

Referring to FIG. 9, once the composite material layout has advanced completely through the cap-forming device, the composite material layout 50, with the pre-cured cap insert 56, is positioned in a cavity 102 of a flexible mandrel 100. Referring momentarily to FIG. 10, in an embodiment, the flexible mandrel 100 has a length sufficient to accommodate the length of the composite material layout 50. Both ends 103 of the flexile mandrel taper from a first or foot surface 104 to a second or cap surface 106. In an embodiment, the flexible mandrel 100 is formed of an elastomeric material, such as silicone, and has a Shore A durometer hardness of from about 50 to about 70. One such suitable elastomeric material is GT 1364 RTV Silicone manufactured by GT Products, Inc. of Grapevine, Tex. Other suitable elastomeric materials known to those skilled in the art for forming molds may also be used. The flexible mandrel 100 can be bent, flexed, and/or manipulated to allow access to cavity 102 even to areas of the flexible mandrel 100 that have significant die lock regions, e.g., undercut areas in the mold that can obstruct part removal from the mold's cavity.

Referring back to FIG. 9, in an exemplary embodiment, the cavity 102 is defined by projection of a variable T-shaped cross-sectional opening 108 longitudinally through the flexible mandrel 100 along the length of the cavity 102. The variable T-shaped cross-sectional opening 108 has a cap cavity section 110 and a web cavity section 112 that extends between the cap cavity section 110 and an outer surface 114 of the flexible mandrel 100. As illustrated, the cap cavity section 110 represents an undercut area or die lock region in the flexible mandrel 100.

In an exemplary embodiment, the composite material layout 50 is positioned into the flexible mandrel 100 by bending and manipulating portions of the mandrel to progressively expose portions of the cap cavity section 110. The preformed cap section 99 is then progressively fed into the exposed portions of the cap cavity section 110. As the exposed portions of the cap cavity section 110 become filled with the preformed cap section 99 of the composite material layout 50, bent portions of the flexible mandrel 100 are allowed to relax and return to their original position, capturing a web portion 120 of the lengths 96 and 98 of the plies of the composite material layout 50 in the web cavity section 112. Extending from the web cavity section 112 to outside of the flexible mandrel 100 is a first outermost or foot portion 116 of length 96 and a second outermost or foot portion 118 of length 98. In an exemplary embodiment, foot portions 116 and 118 of lengths 96 and 98, respectively, are folded over along adjacent sides 122 of outer surfaces 114 of the flexible mandrel 100 to form a preformed foot section 124, for example foot section 24 of FIG. 1, of the composite material layout. As such, the composite material layout 50 has a variable "I-shape" cross-section 126 formed by the preformed cap section 99, the web portion 120, and the preformed foot section 124 to define a composite material preformed stringer 128, such as fiber reinforced composite stringer 12 of FIG. 1.

Figure 11:
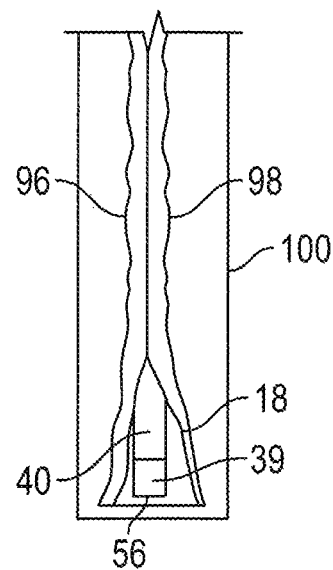
FIG. 11 illustrates the formation of a runout portion of the reinforced composite structure, in accordance with an exemplary embodiment.

As illustrated in FIG. 11, once the composite material layout 50 is positioned in the flexible mandrel, in an embodiment, a web-wedge insert, such as web-wedge insert 39 of FIGS. 4C-4E, is arranged in the runout portions 18 of the resulting composite material preformed stringer 128. The web-wedge insert 39 allows for a continuous and strengthened transition of the preformed cap section 99 from the center of the stringer to the runout portions 18 to the skin structure 14.

Next, referring back to FIG. 9, in an exemplary embodiment, a radius filler 130 is disposed in a longitudinal space 132 formed at the merging of the web portion 120 and the preformed foot section 124 and between the first foot portion 116 of length 96 and second foot portion 118 of length 98. In an embodiment, the radius filler 130 is made of a curable polymeric material that may be reinforced with fibers and/or fillers, or alternatively, may not include any reinforcing material. In the un-cured state, the radius filler 130 may be configured as a flexible elongated body or flexible rod. The radius filler 130 minimizes or prevents defects that might otherwise subsequently form along the interface between the skin structure 14 and the composite material preformed stringer 128 from the presence of the longitudinal space 132. Before or after placement of the radius filler 130, the flexible mandrel, with the composite material layout 50, is placed inside an inflexible support structure 101. The inflexible support structure 101 is formed of any inflexible, rigid material such as, for example, wood, which prevents the flexible mandrel 100 from flexing, bending or twisting during application of heat and pressure, as discussed in more detail below.

Figure 12:
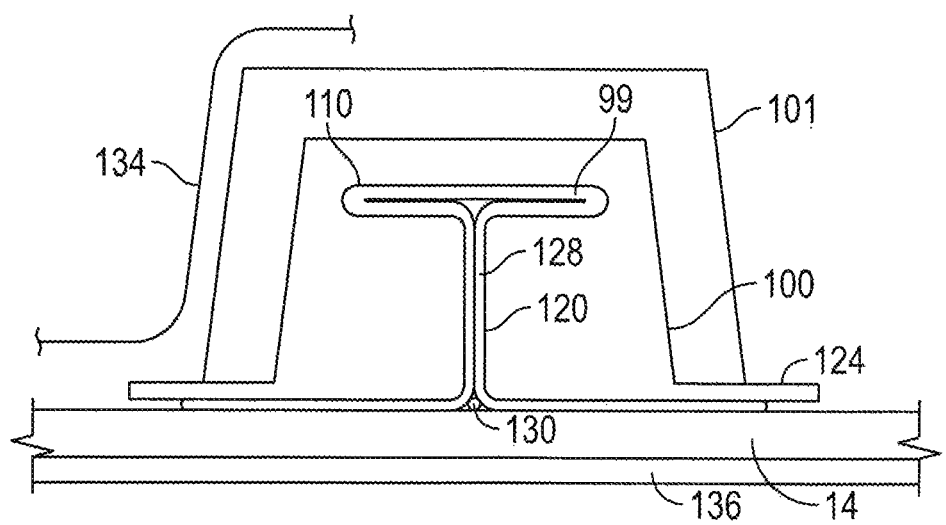
FIG. 12 illustrates in cross-sectional view the formation of the reinforced composite structure using the flexible mandrel and an inflexible support structure, in accordance with an exemplary embodiment.

Referring to FIG. 12, the composite material preformed stringer 128, together with the flexible mandrel 100, is positioned on the skin structure 14 such that the preformed foot section 124 is adjacent to the skin structure 14. In an exemplary embodiment, the skin structure 14 comprises an uncured fiber reinforced material, such as, for example, a layout of composite material plies that are impregnated with resin. Although the present embodiment describes the skin structure 14 as comprising an uncured fiber reinforced material, it is to be understood that in alternative embodiments, the skin structure 14 can comprise a cured fiber reinforced material. As illustrated, a vacuum bag arrangement 134 is arranged over the skin structure 14 and the flexible mandrel 100 with the composite material preformed stringer 128 sandwiched between the skin structure 14 and the flexible mandrel 100. In an embodiment, a support 136 is positioned under the skin structure 14. Heat and pressure are applied to co-cure the composite material preformed stringer 128 and the skin structure 14. Well known processes and conditions for applying heat and pressure to uncured fiber reinforced materials, such as using an autoclave in combination with the vacuum bag arrangement 134, may be used to co-cure the composite material preformed stringer 128 and the skin structure 14. The inventors have found that the flexible mandrel 100 flexes under pressure to conform to the outer surface of the skin structure 14, while the inflexible support structure 101 prevents the flexible mandrel from buckling or twisting away from the skin structure 14, causing the preform foot section 124 of the composite material preformed stringer 128, which is sandwiched between the flexile mandrel 100 and the skin structure, to continuously follow the contours and any small steps or drop-offs of the skin structure's outer surface. As such, under compressed or over compressed areas along the interface between the skin structure 14 and the stringer 128 are reduced, minimized, or eliminated. The inflexible support structure 101 then is removed from the flexible mandrel 100. The flexible mandrel 100 in turn is removed from the composite material preformed stringer 128 by bending and manipulating portions of the flexible mandrel 100 to progressively release the preformed cap section 99 of the composite material preformed stringer 128 from the cap cavity section 110.

Figure 13:
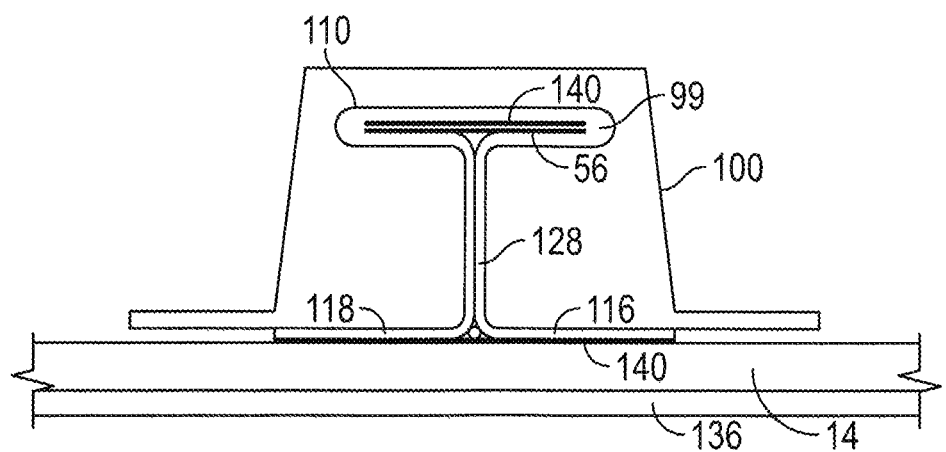
FIG. 13 illustrates in cross-sectional view the formation of the reinforced composite structure using a film adhesive, in accordance with another exemplary embodiment.

In an optional embodiment, illustrated in FIG. 13, a film adhesive 140 is arranged between the pre-cured cap insert 56 and the composite material plies 52 and 54 before folding the plies over the pre-cured cap insert, and/or between the skin structure 14 and the foot portions 116 and 118 before co-curing the composite material preformed stringer 128 and the skin structure 14. The film adhesive may comprise a curable polymeric resin and helps improve adhesion strength.

As will be appreciated, using the cap-forming device 60, the flexible mandrel 100, and the inflexible support structure 101, the formation of reinforced composite structures for aircraft can be automated so that they are formed quickly and efficiently compared to manual methods. Further, such tooling facilitates manufacture of the stringers without defects and non-conformities typical of manual methods. The cap-forming device 60, the flexible mandrel 100, and the inflexible support structure 101 can be used in a batch system or can be incorporated in a conveyor- and/or assembly-type system in which the reinforced composite structures are formed in a continuous manner.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A device for forming a cap section of an I-stringer of an aircraft, the device comprising:
    a base;
    a first support member fixedly attached to the base;
    a second support member fixedly attached to the base and aligned parallel to the first support member, wherein the first support member and the second support member are spaced a first distance apart; and
    two pinching wheels spaced a second distance apart, wherein the two pinching wheels are positioned proximate to ends of the first support member and the second support member, wherein the second distance is less than the first distance, and wherein the two pinching wheels are configured to receive a composite material layout between them and to cause two opposing lengths of the composite material layout to contact each other.

2. The device of claim 1, further comprising a first diagonal member supported by the first support member and having a first end, and
    a second diagonal member supported by the second support member and having a first end, wherein the first diagonal member forms an angle with the second diagonal member and the first end of the first diagonal member is spaced a third distance from the first end of the second diagonal member, and wherein a center of the first distance is co-linear with a center of the third distance.

3. The device of claim 2, wherein the center of the second distance is co-linear with the center of the first distance and the center of the third distance.

4. The device of claim 1, further comprising a vertical wheel configured to roll along the base between the first support member and the second support member.

5. The device of claim 4, wherein the vertical wheel is configured to roll along a center of the first distance.

6. The device of claim 4, further comprising:
    a first rail fixedly coupled to the base;
    a second rail fixedly coupled to the base;
    a rod rotatably coupled to the first rail and the second rail and supporting the vertical wheel.

7. An apparatus comprising:
    a first support member having a first end;
    a second support member having a first end and aligned parallel to the first support member, wherein the first support member and the second support member are spaced a first distance apart;
    a vertical wheel configured to roll between the first support member and the second support member;
    two pinching wheels spaced a second distance apart, wherein the two pinching wheels are positioned proximate to the first ends of the first support member and the second support member and wherein the second distance is less than the first distance;
    a first diagonal member supported by the first support member;
    a second diagonal member supported by the second support member, wherein the first diagonal member forms an angle with the second diagonal member and each have ends that are spaced a third distance apart from each other, wherein a center of the first distance is co-linear with a center of the third distance.

8. The apparatus of claim 7 further comprising a base to which the first support member and the second support member are fixedly attached.

9. The apparatus of claim 8, further comprising:
    a first rail fixedly attached to the first support member;
    a second rail fixedly attached to the second support member;
    a rod rotatably coupled to the first rail and the second rail and supporting the vertical wheel such that the vertical wheel is configured to roll along the base.

10. The apparatus of claim 7, wherein the two pinching wheels are configured to receive a composite material layout between them and cause two lengths of the composite material layout to contact each other.

11. An apparatus comprising:
    a base;
    a first support member supported by the base and having a first end;
    a second support member supported by the base and having a first end and aligned parallel to the first support member;
    two pinching wheels positioned proximate to the first ends of the first support member and the second support member;
    a first diagonal member supported by the first support member;
    a second diagonal member supported by the second support member, wherein the first diagonal member forms an angle with the second diagonal member and wherein each have ends that are proximate to the first ends of the first support member and the second support member and to the two pinching wheels; and a vertical wheel configured to roll between the first support member and the second support member and between the first diagonal member and the second diagonal member.

12. The apparatus of claim 11, further comprising:
a first rail fixedly attached to the first support member;
a second rail fixedly attached to the second support member;
a rod rotatably coupled to the first rail and the second rail and supporting the vertical wheel such that the vertical wheel is configured to roll along the base.

13. The apparatus of claim 11, wherein the two pinching wheels are configured to receive a composite material layout between them and cause two lengths of the composite material layout to contact each other.

* * * * *